United States Patent
Kao et al.

(10) Patent No.: US 12,400,065 B2
(45) Date of Patent: Aug. 26, 2025

(54) CAPTURE IR DROP ANALYZER AND ANALYZING METHOD THEREOF

(71) Applicants: Global Unichip Corporation, Hsinchu (TW); Taiwan Semiconductor Manufacturing Company, Ltd., Hsinchu (TW)

(72) Inventors: Chen-Yuan Kao, Hsinchu (TW); Min-Hsiu Tsai, Hsinchu (TW)

(73) Assignees: Global Unichip Corporation, Hsinchu (TW); Taiwan Semiconductor Manufacturing Company, Ltd., Hsinchu (TW)

( * ) Notice: Subject to any disclaimer, the term of this patent is extended or adjusted under 35 U.S.C. 154(b) by 691 days.

(21) Appl. No.: 17/844,083

(22) Filed: Jun. 20, 2022

(65) Prior Publication Data

US 2023/0342536 A1 Oct. 26, 2023

(30) Foreign Application Priority Data

Apr. 22, 2022 (TW) .................................. 111115335

(51) Int. Cl.
*G06F 30/396* (2020.01)
*G06F 30/34* (2020.01)
*G06F 30/398* (2020.01)

(52) U.S. Cl.
CPC ............ *G06F 30/396* (2020.01); *G06F 30/34* (2020.01); *G06F 30/398* (2020.01)

(58) Field of Classification Search
USPC ........................................................ 716/111
See application file for complete search history.

(56) References Cited

U.S. PATENT DOCUMENTS

| | | | | |
|---|---|---|---|---|
| 9,881,120 | B1* | 1/2018 | Ginetti | G06F 30/367 |
| 2003/0151100 | A1* | 8/2003 | Toyoshima | H10B 10/00 |
| | | | | 257/E27.098 |
| 2004/0243952 | A1* | 12/2004 | Croix | G06F 30/367 |
| | | | | 716/108 |
| 2011/0270598 | A1* | 11/2011 | Zou | G06F 30/367 |
| | | | | 716/103 |

(Continued)

FOREIGN PATENT DOCUMENTS

| | | |
|---|---|---|
| TW | 583760 | 4/2004 |
| TW | I472004 | 2/2015 |
| TW | 202143086 | 11/2021 |

OTHER PUBLICATIONS

"Office Action of Taiwan Counterpart Application", issued on Mar. 28, 2023, p. 1-p. 6.

*Primary Examiner* — Mohammed Alam
(74) *Attorney, Agent, or Firm* — JCIPRNET (57) ABSTRACT

A capture IR drop analyzer and an analyzing method thereof are provided. The capture IR drop analyzing method includes: receiving circuit layout information and package model information of a circuit; analyzing a plurality of circuit blocks respectively corresponding to a plurality of bump current sources according to the circuit layout information and the package model information; calculating at least one critical circuit block according to each of the bump current sources and a current demand value of each of the corresponding circuit blocks; and analyzing a clock tree architecture of the at least one critical circuit block to obtain design structure adjustment information.

14 Claims, 10 Drawing Sheets

(56) References Cited

U.S. PATENT DOCUMENTS

2014/0365148 A1* 12/2014 Tehranipoor ... G01R 31/318364
702/60
2019/0220560 A1* 7/2019 Chhabra .............. G01R 21/133
2023/0342536 A1* 10/2023 Kao ...................... G06F 30/398

* cited by examiner

CAPTURE IR DROP ANALYZER AND ANALYZING METHOD THEREOF

CROSS-REFERENCE TO RELATED APPLICATION

This application claims the priority benefit of Taiwan application serial no. 111115335, filed on Apr. 22, 2022. The entirety of the above-mentioned patent application is hereby incorporated by reference herein and made a part of this specification.

BACKGROUND OF THE INVENTION

Field of the Invention

The invention relates to a capture IR drop analyzer and an analyzing method thereof, and more particularly, to a capture IR drop analyzer and an analyzing method thereof capable of reducing analyzing time.

Description of Related Art

In circuit design, IR drop often causes abnormal circuit operation. In the past, there has been no specific mitigation plans for capture voltage drop, and the IR analysis is usually too time-consuming, and the provided vector is not representative, which makes it impossible to comprehensively analyze the capture IR drop for the circuit.

SUMMARY OF THE INVENTION

The invention provides a capture IR drop analyzer and an analyzing method thereof that may effectively obtain design structure adjustment information of a circuit.

A capture IR drop analyzing method of the invention includes: receiving circuit layout information and package model information of a circuit; analyzing a plurality of circuit blocks respectively corresponding to a plurality of bump current sources according to the circuit layout information and the package model information; calculating at least one critical circuit block according to each of the bump current sources and a current demand value of each of the corresponding circuit blocks; and analyzing a clock tree architecture of the at least one critical circuit block to obtain design structure adjustment information.

A capture IR drop analyzer of the invention includes a transmission interface and a controller. The transmission interface is configured to receive circuit layout information and package model information of a circuit. The controller is coupled to the transmission interface and configured to: analyze a plurality of circuit blocks respectively corresponding to a plurality of bump current sources according to the circuit layout information and the package model information; calculate at least one critical circuit block according to each of the bump current sources and a current demand value of each of the corresponding circuit blocks; and analyze a clock tree architecture of the at least one critical circuit block to obtain design structure adjustment information.

Based on the above, the analyzing method of capture IR drop of an embodiment of the invention may avoid the time-consuming voltage drop analysis operation by defining the high risk area of the capture voltage drop on the circuit, and may comprehensively evaluate the voltage drop risk in the capture mode of the circuit scan chain.

DESCRIPTION OF THE EMBODIMENTS

Figure 1:
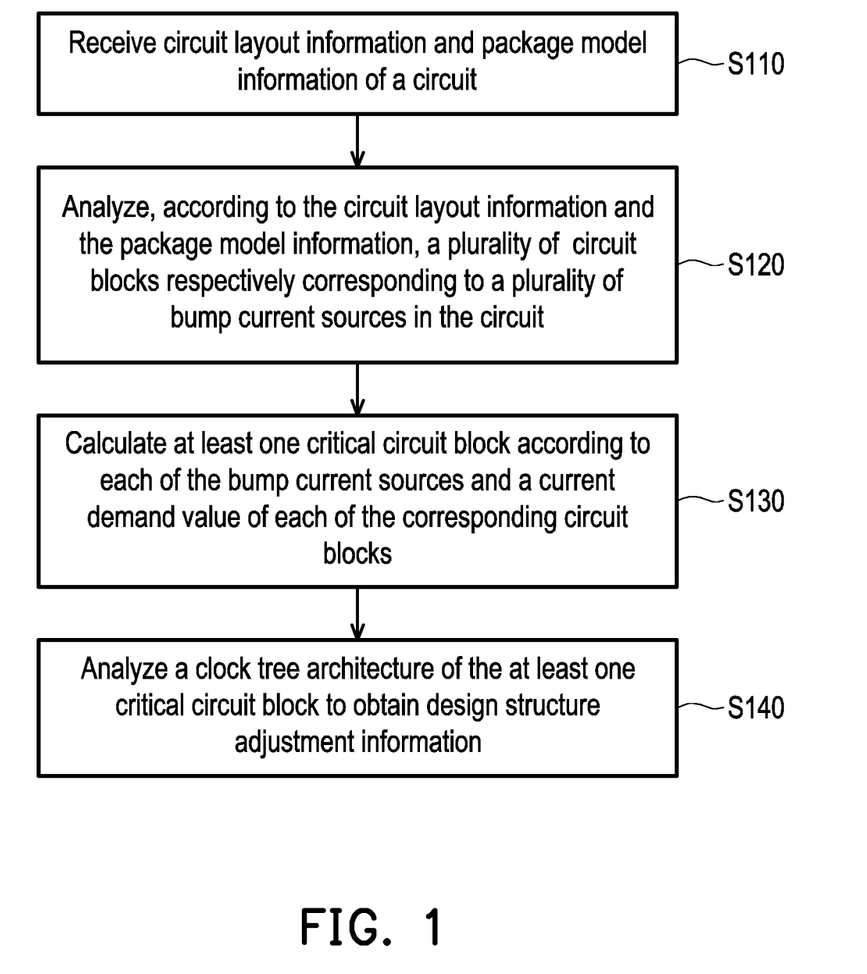
FIG. 1 shows a flowchart of an analyzing method of capture IR drop of an embodiment of the invention.

Referring to FIG. 1, FIG. 1 shows a flowchart of an analyzing method of capture IR drop of an embodiment of the invention. In particular, in step S110, circuit layout information and package model information of a circuit are received. In particular, the package model information is a circuit netlist with resistance, capacitance, and inductance information. In the present embodiment, the receiving action of the circuit layout information may be performed by receiving a file in DEF (Design Exchange Format) format or a file in LEF (Library Exchange Format) format. Next, in step S120, a plurality of circuit blocks respectively corresponding to a plurality of bump current sources in the circuit may be analyzed according to the received circuit layout information and package model information. In particular, a plurality of bump current sources may be included in the circuit. In particular, each of the bump current sources may be configured to drive corresponding circuit blocks. The driven circuit blocks may include a plurality of registers, and these registers may respectively belong to one or a plurality of clock tree architectures.

In step S130, next, each of the bump current sources is analyzed, and at least one critical circuit block is calculated according to each of the bump current sources and the current demand value of each of the corresponding circuit blocks. In particular, in the present embodiment, the calculation may be performed one by one for the current demand value of each of the circuit blocks corresponding to each of the bump current sources. Moreover, current demand values that are too large are found, so as to set the corresponding one or plurality of circuit blocks as critical circuit blocks.

Further, in step S140, the clock tree architecture of the one or plurality of critical circuit blocks is analyzed to obtain design structure adjustment information.

In the present embodiment, the design structure adjustment information may be configured to allow the designer to adjust the circuit architecture of the critical circuit blocks of a circuit, and may also be configured as a basis for setting constraint conditions for electronic design automation (EDA) applications such as automatic test pattern generation (ATPG).

In the present embodiment, according to the design structure adjustment information, the current demand values of the critical circuit blocks in the circuit may be reduced, and the influence of the capture IR drop on circuit performance may be reduced. Moreover, the analysis method of capture IR drop of the present embodiment may analyze the critical circuit blocks in the circuit, and in the full-scale analysis of the circuit, a design structure adjustment strategy may be quickly calculated for the critical circuit blocks to effectively improve the efficiency of circuit design.

Figure 2:
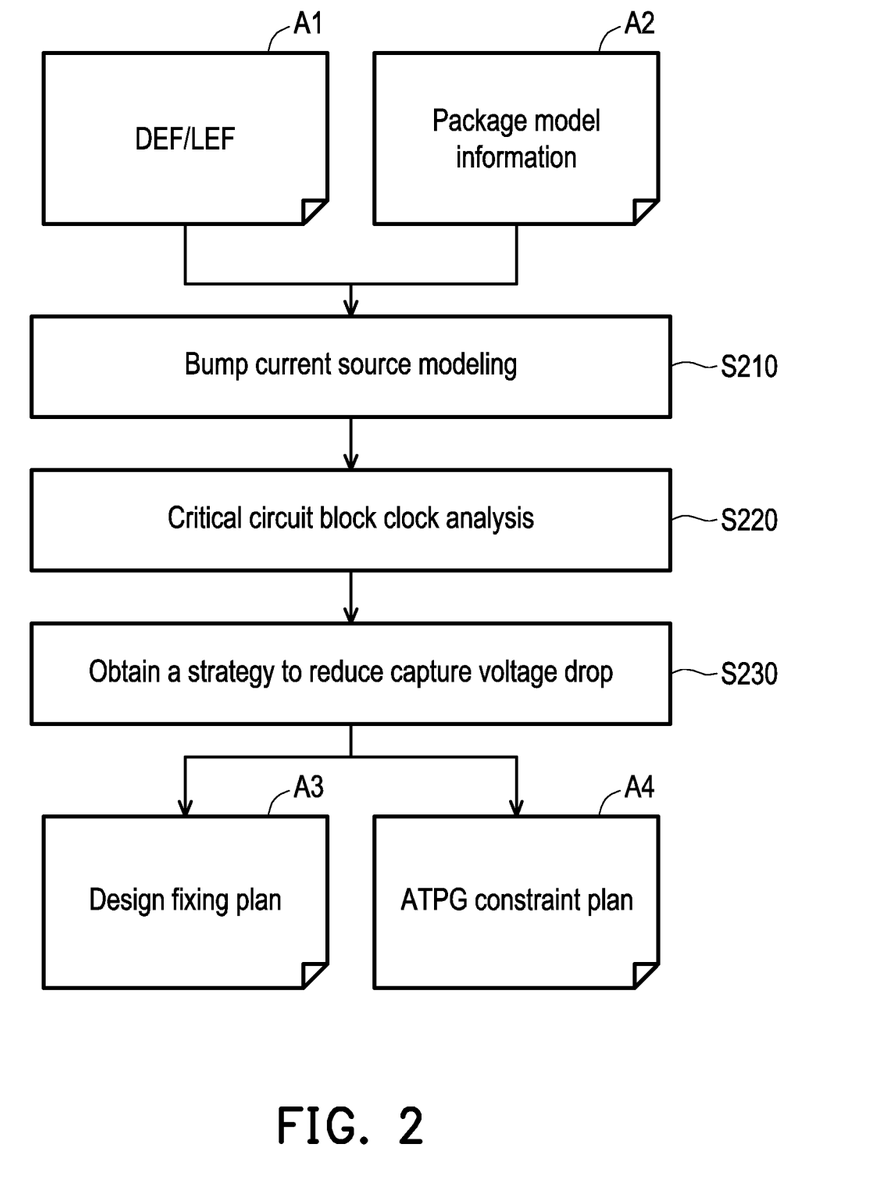
FIG. 2 shows a flowchart of an analyzing method of capture IR drop of another embodiment of the invention.
Figure 3:
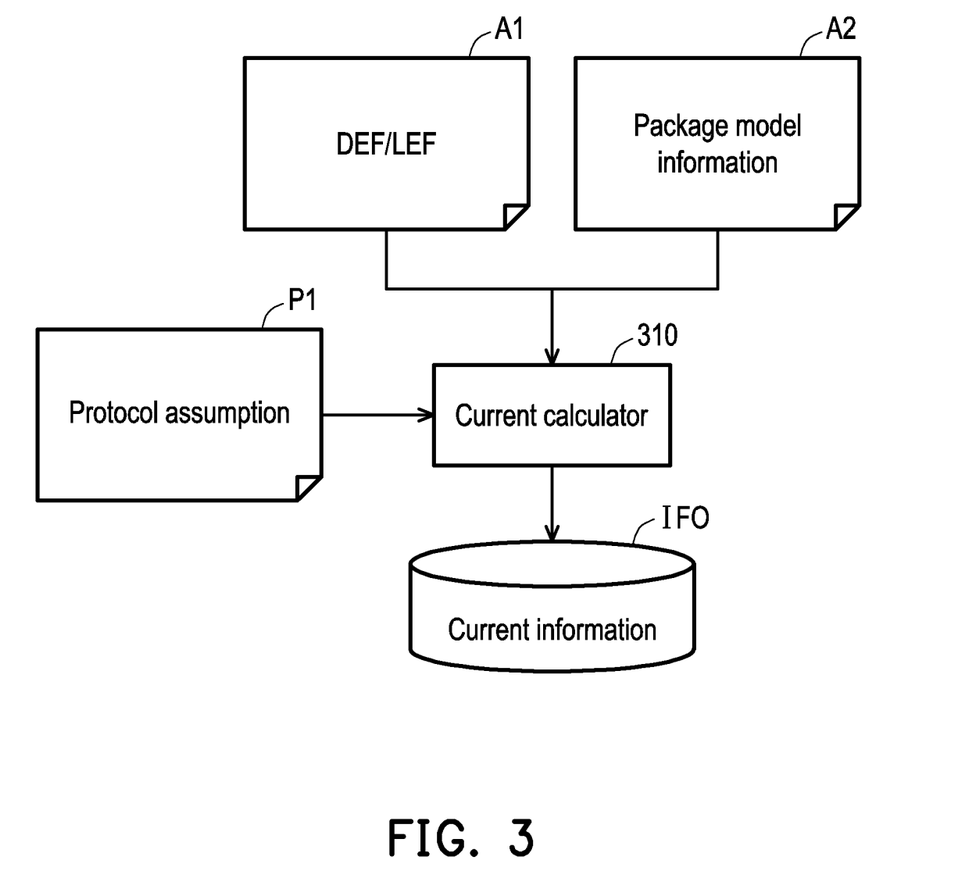
FIG. 3 and FIG. 4 show schematic diagrams of an embodiment of a modeling operation of a bump current source.
Figure 4:
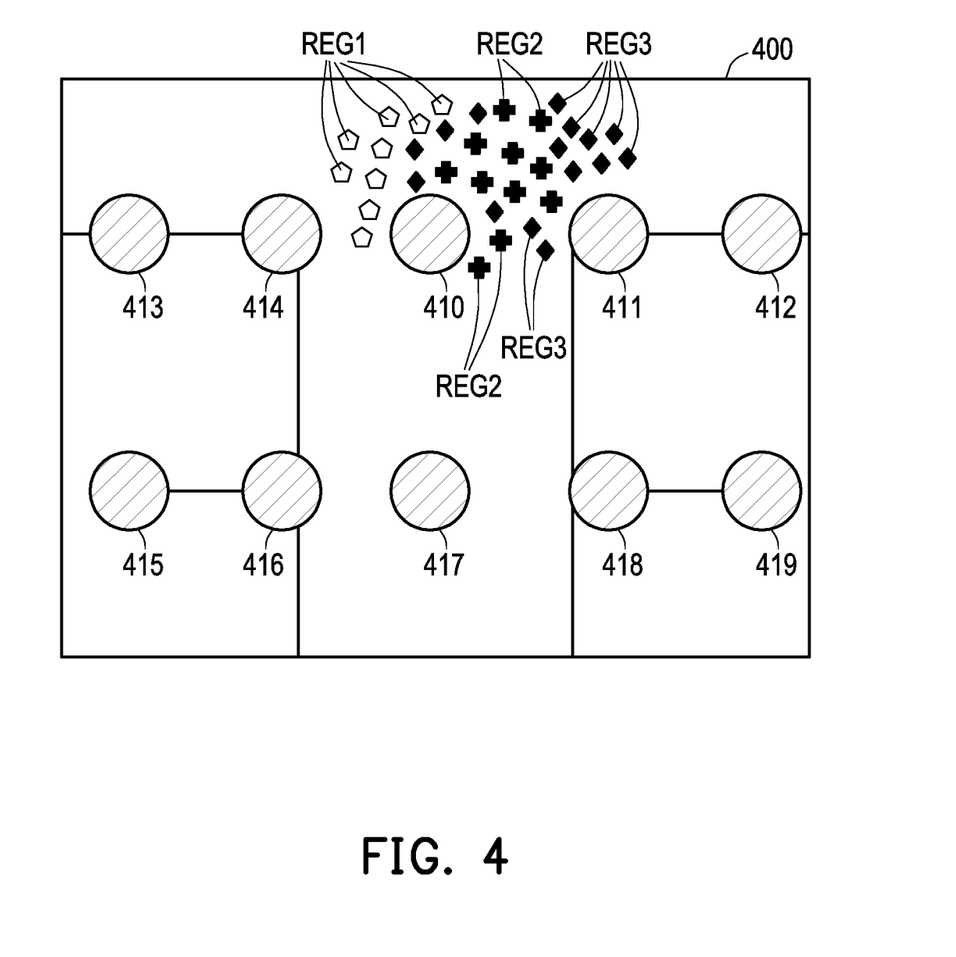

Referring to FIG. 2, FIG. 2 shows a flowchart of an analyzing method of capture IR drop of another embodiment of the invention. In particular, circuit layout information A1 and package model information A2 of files in DEF (Design Exchange Format) or files in LEF (Library Exchange Format) may be received. Next, in step S210, the modeling operation of a bump current source in the circuit may be performed according to the circuit layout information A1 and the package model information A2. For details, please refer to FIG. 3 and FIG. 4 showing schematic diagrams of an embodiment of a modeling operation of bump current sources. In FIG. 3, the modeling action of the bump current sources may be performed via a current calculator 310 to calculate the current supply state of each of the bump current sources according to the circuit layout information A1, the package model information A2 and an assumption protocol P1. In particular, in FIG. 4, a circuit 400 has a plurality of bump current sources 410 to 419. The bump current sources 410 to 419 are disposed at a plurality of positions of the circuit 400. The plurality of bump current sources 410 to 419 respectively supply the working currents of the plurality of circuit blocks, and each of the circuit blocks includes a plurality of registers, and these registers may belong to one or a plurality of different clock tree architectures. Taking the bump current source 410 as an example, the circuit block corresponding to the bump current source 410 has a plurality of registers REG1 to REG3, and the registers REG1 to REG3 may respectively belong to three different clock tree architectures.

Figure 5:
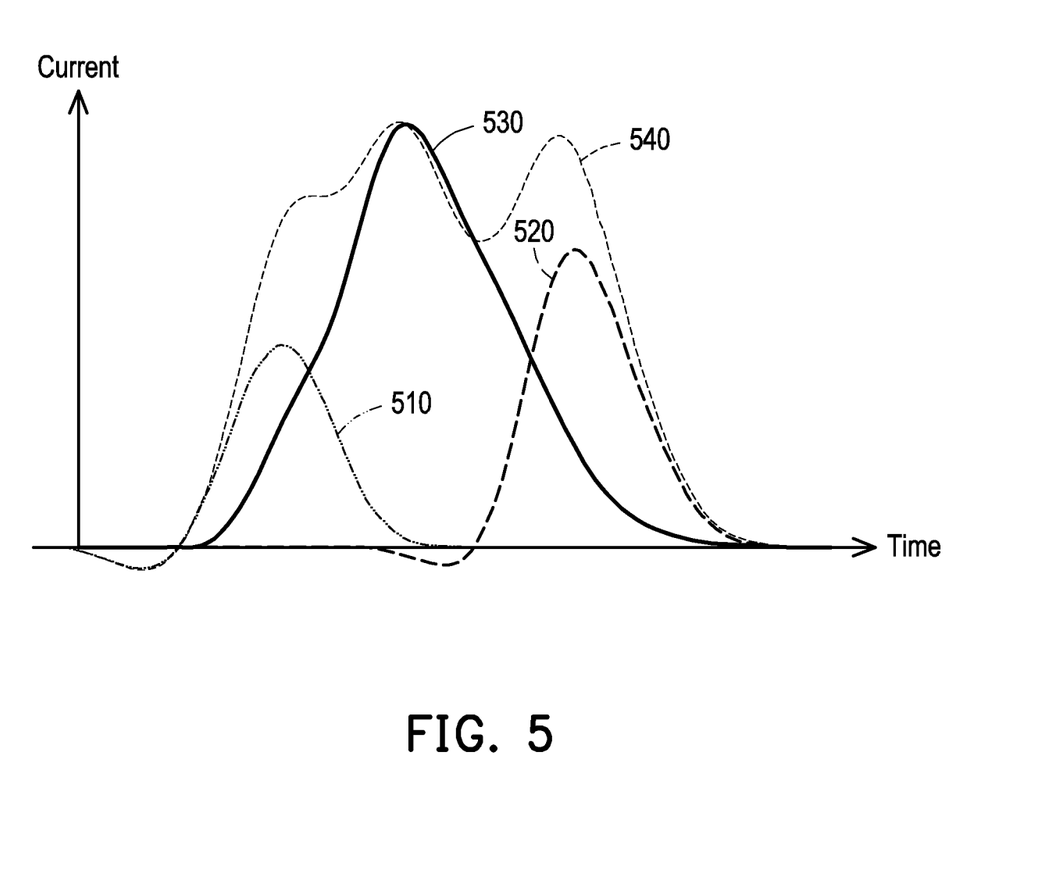
FIG. 5 shows a waveform diagram of current demand of a circuit element under a clock tree architecture in a circuit block.

The current calculator 310 may calculate the current demand value of each of the registers REG1 to REG3, and calculate the current demand value of the circuit block corresponding to the bump current source 410. The current calculator 310 may be implemented by a controller with computing capability. Here, please refer to FIG. 5 showing a waveform diagram of current demand of a circuit element under a clock tree architecture in a circuit block. In particular, a waveform 510 represents the working current generated by the register corresponding to the clock signal in the clock tree architecture; a waveform 520 represents the working current generated by the combinational logic circuit; a waveform 530 represents the working current generated by data transmission and reception; and a waveform 540 is the sum of the working currents of the waveforms 510 to 530.

It should be mentioned that, the assumption protocol P1 received by the current calculator 310 is a clock signal of a preset clock tree architecture and an action protocol for data transmission and reception, such as a toggle rate of the clock signal. Via the calculation of various demand currents, the current calculator 310 may generate a current information IFO, wherein the current information IFO includes a plurality of current demand values corresponding to each of the bump current sources 410 to 419 under the condition of different toggle rates of the clock signal.

In the present embodiment, the current information IFO may be stored in a memory and form a look-up table.

Figure 6:
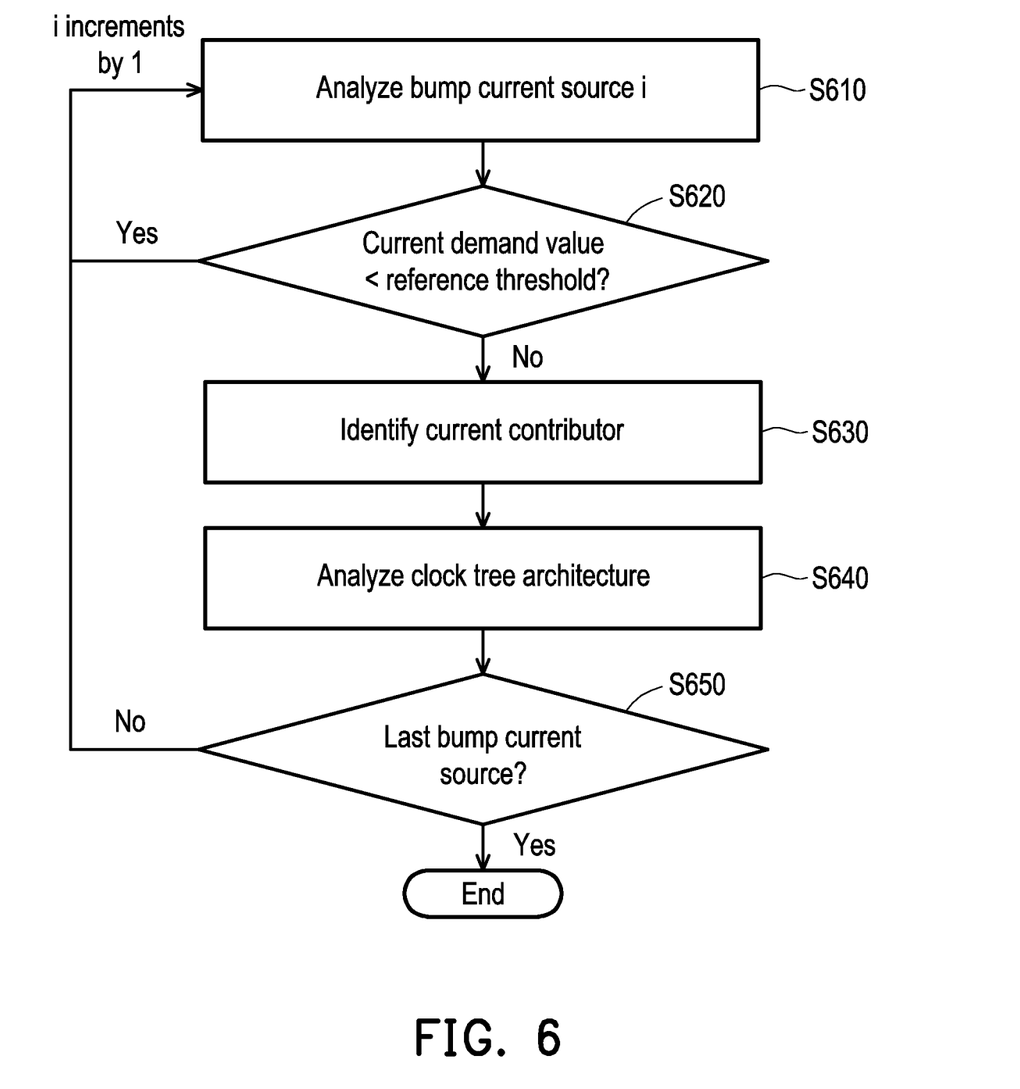
FIG. 6 shows a flowchart of a critical circuit block identification operation of an embodiment of the invention.

Referring again to FIG. 2, following step S210, a critical circuit block clock analysis is performed in step S220. In particular, according to the current information IFO obtained in step S210, the identification action of critical circuit blocks may be performed. Here, referring to FIG. 6, FIG. 6 shows a flowchart of a critical circuit block identification operation of an embodiment of the invention. In step S610, an analysis may be performed for a bump current source i (the i-th bump current source), wherein i=1 in the initial state. In step S620, whether the current demand value of the bump current source i is smaller than the reference threshold is determined. In particular, the reference threshold is one preset value used as a basis for determining whether the capture IR drop is too large.

When the current demand value of the bump current source i is less than the reference threshold, the value of i is incremented by 1 and steps S610 and S620 are performed again to analyze the next bump current source i. When the current demand value of the bump current source i is not less than the reference threshold, the circuit block corresponding to the bump current source i may be set as a critical circuit block, and step S630 is performed.

In step S630, the action of current contributor identification may be performed for the critical circuit blocks. Moreover, circuit elements in the critical circuit blocks contributing a large current peak value to the bump current source i are found for identification. Next, in step S640, the architecture analysis operation of the clock tree is performed for the identified circuit elements contributing a large current peak value.

In step S650, next, whether the analysis of the last bump current source is completed is determined. If not, the analysis action of the next bump current source is performed, and if yes, the entire action flow is ended.

Referring to FIG. 2 again, following step S220, in step S230, a relevant strategy for reducing capture voltage drop may be obtained according to the clock tree architecture generated by the process of FIG. 6. In particular, referring to FIG. 7A to FIG. 7C, FIG. 7A to FIG. 7C respectively show a clock tree architecture of a circuit element in a critical circuit block contributing a large current peak value and a schematic diagram of correspondingly generated design structure adjustment information of an embodiment of the invention.

Figure 7A:
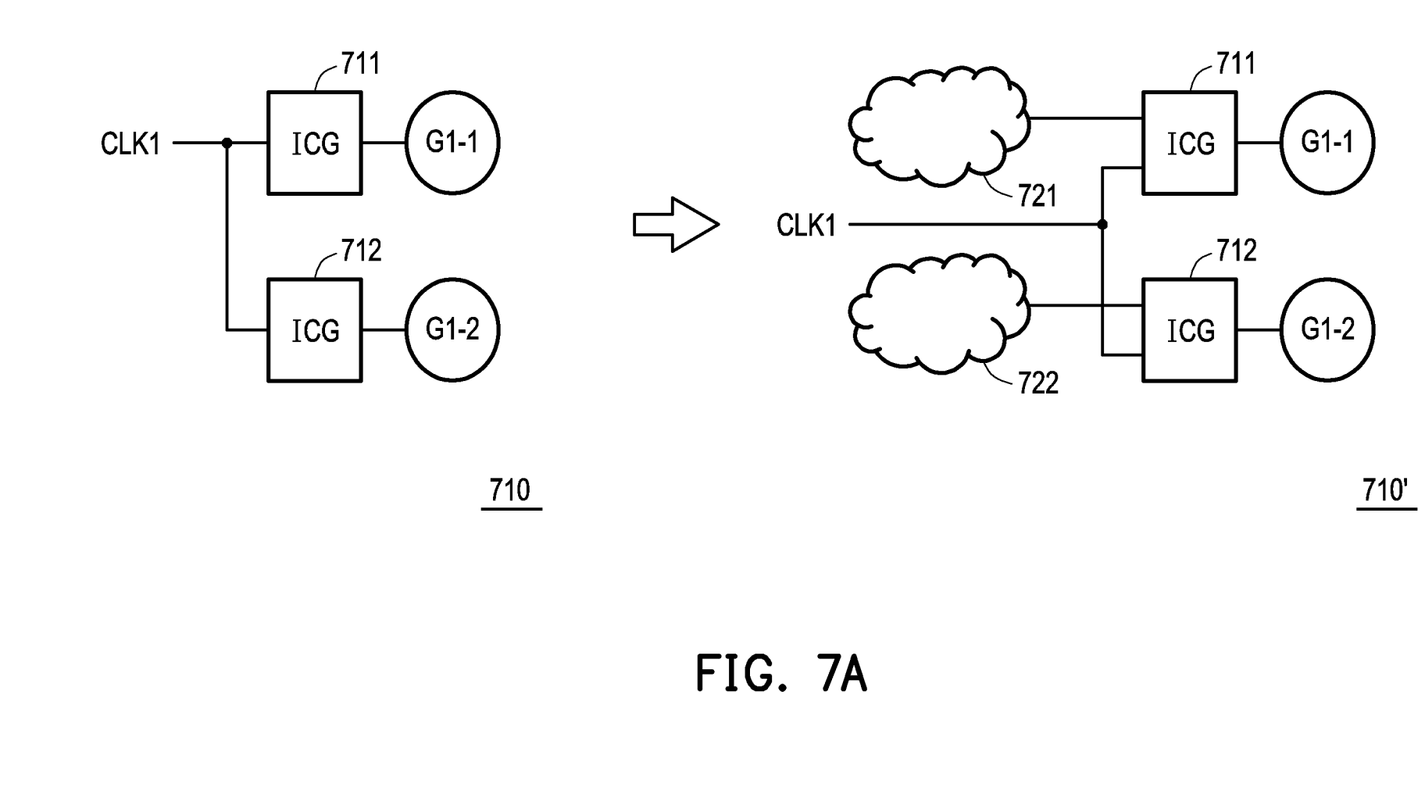
FIG. 7A to FIG. 7C respectively show a clock tree architecture of a circuit element in a critical circuit block contributing a large current peak value and a schematic diagram of correspondingly generated design structure adjustment information of an embodiment of the invention.

In FIG. 7A, a clock tree architecture 710 corresponds to a clock signal CLK1. In the clock tree architecture 710, integrated control gates (ICGs) 711 and 712 correspond to control registers G1-1 and G1-2, respectively. In particular, when the two first quantities of the registers G1-1 and G1-2 controlled by the ICGs 711 and 712 are both smaller than a preset reference value k, the correspondingly generated design structure adjustment information may be configured to add logic circuits 721 and 722 to control the ICGs 711 and 712, respectively, and via the logic circuits 721 and 722, the ICGs 711 and 712 are activated in a time-share manner, and a new clock tree architecture 710' is generated.

Figure 7B:
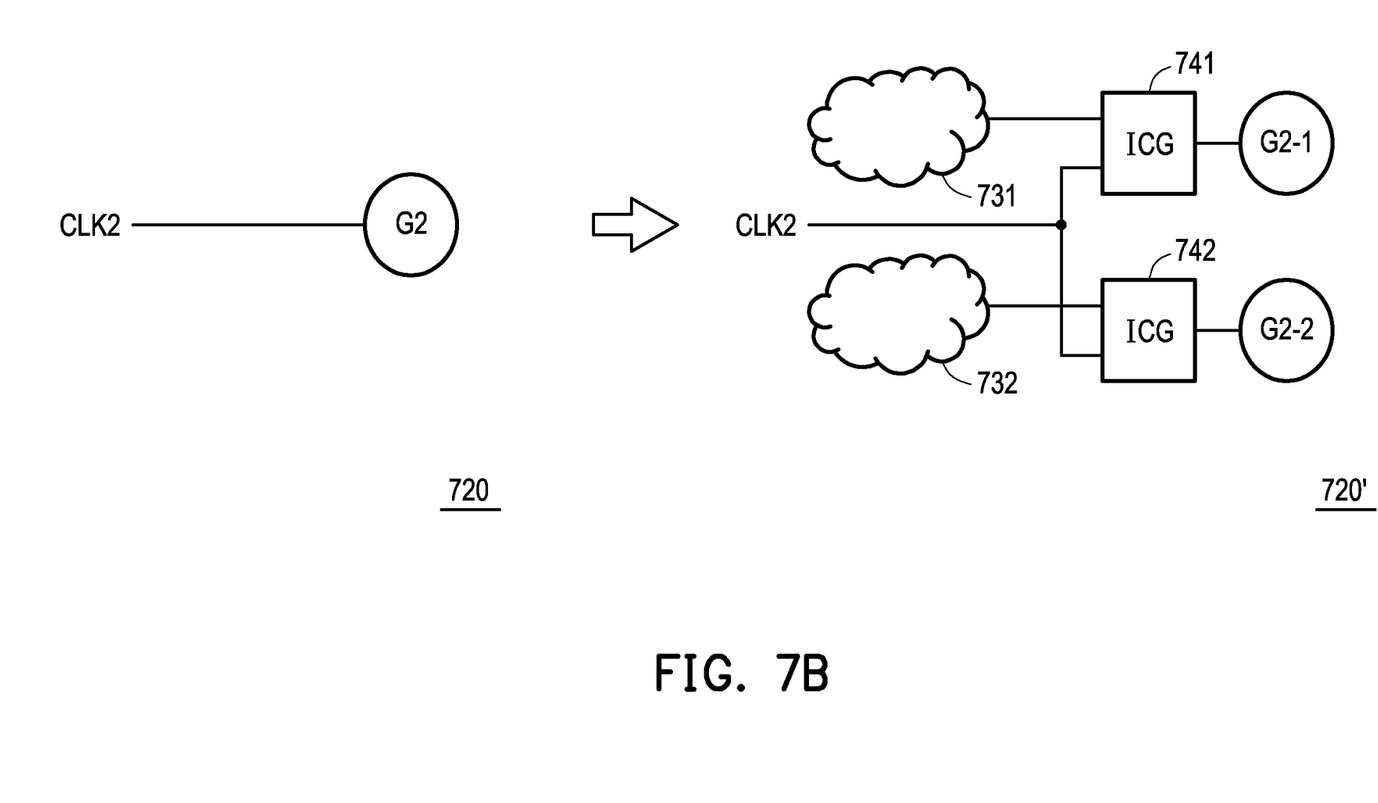

In FIG. 7B, a clock tree architecture 720 corresponds to a clock signal CLK2. In the clock tree architecture 720, when a second quantity of a plurality of registers G2 not controlled by an ICG is greater than the preset reference value k, the correspondingly generated design structure adjustment information may be configured to split the registers G2 into registers G2-1 and G2-2 of a plurality of portions, and provide a plurality of auxiliary ICGs 741 and 742 to be respectively coupled between the clock signal CLK2 and the registers G2-1 and G2-2. Moreover, a new clock tree architecture 720' is generated by adding a plurality of logic circuits 731 and 732 to be respectively coupled to the auxiliary ICGs 741 and 742 and control the auxiliary ICGs 741 and 742. The logic circuits 731 and 732 are configured to enable the auxiliary ICGs 741 and 742 to be activated in a time-share manner.

Figure 7C:
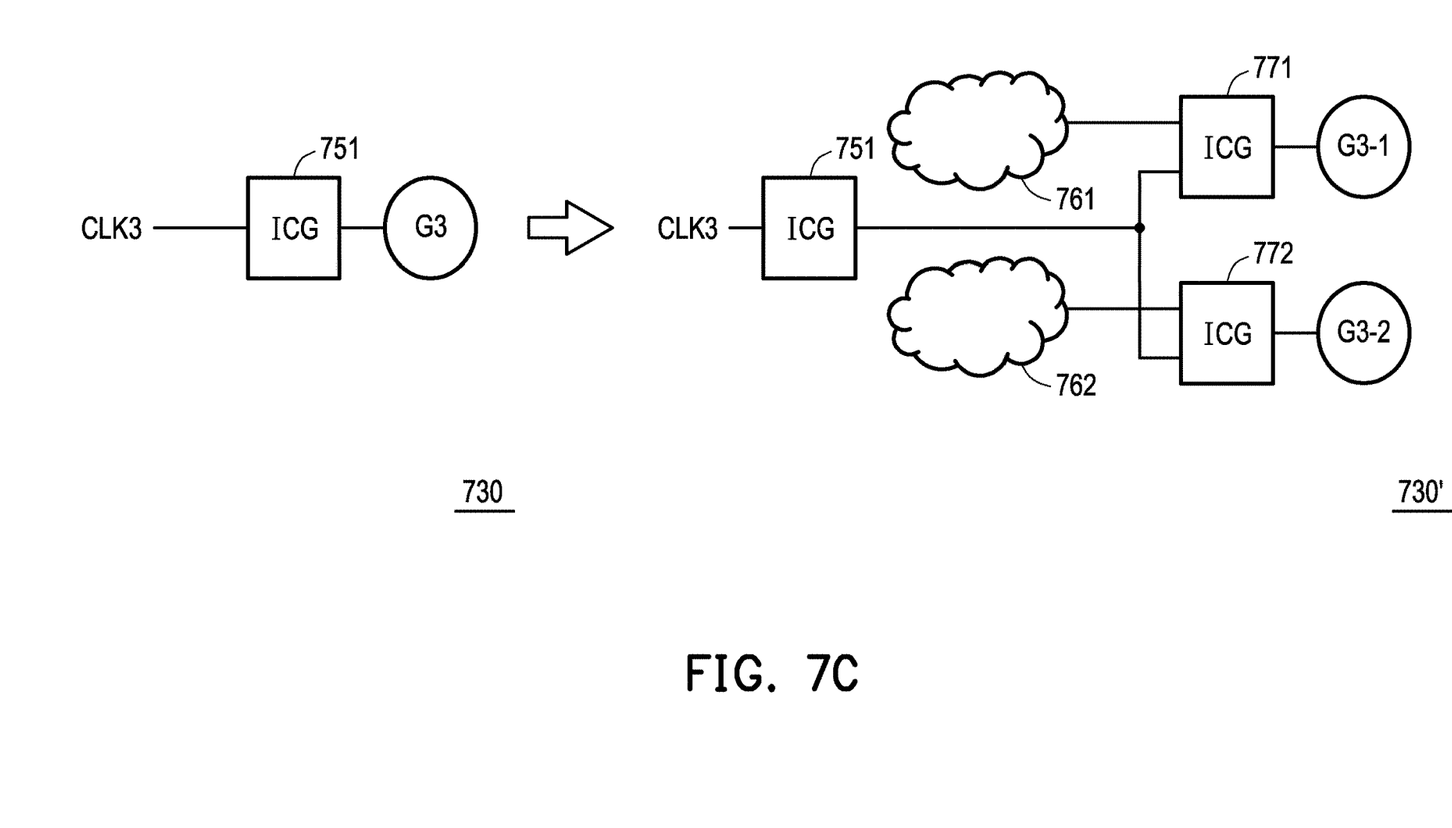

In FIG. 7C, a clock tree architecture 730 corresponds to a clock signal CLK3. In the clock tree architecture 730, an ICG 751 corresponds to a control register G3. In particular, when the first quantity of the register G3 controlled by the ICG 751 is greater than the reference value k, the correspondingly generated design structure adjustment information may be configured to split the register G3 into a register G3-1 of the first portion and a register G3-2 of the second portion, and add ICGs 771 and 772 and logic circuits 761 and 762. The ICGs 771 and 772 are coupled to the ICG 751 and respectively coupled to the registers G3-1 and G3-2, and generate a new clock tree architecture 730'. The logic circuits 761 and 762 respectively control the ICGs 771 and 772 so that the ICGs 771 and 772 are activated in a time-share manner.

Referring back to FIG. 2, according to the strategy for reducing capture voltage drop obtained in step S230, a design fixing plan A3 and an ATPG constraint plan A4 may be generated.

Figure 8:
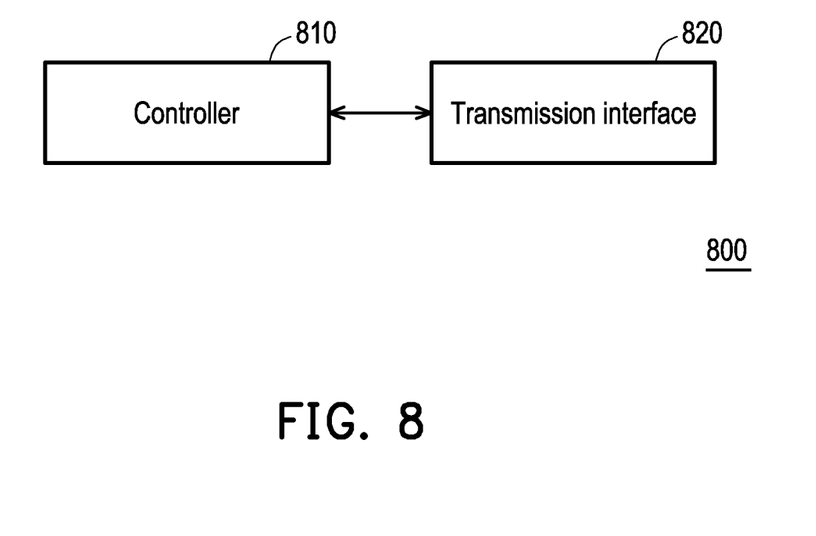
FIG. 8 shows a schematic diagram of a capture IR drop analyzer of an embodiment of the invention.

Please refer to FIG. 8 below. FIG. 8 shows a schematic diagram of a capture IR drop analyzer of an embodiment of the invention. A capture IR drop analyzer 800 includes a transmission interface 820 and a controller 810. The transmission interface 820 and the controller 810 are coupled to each other. The transmission interface 820 may be configured to receive circuit layout information and package model information of a circuit. The controller 810 may be configured to execute steps S120 to S140 shown in FIG. 1 and obtain design structure adjustment information.

In the present embodiment, the controller 810 may be designed by a hardware description language (HDL) or any other design method of a digital circuit known to those having ordinary skill in the art, and is a hardware circuit implemented by a field-programmable gate array (FPGA), complex programmable logic device (CPLD), or application-specific integrated circuit (ASIC). The transmission interface 820 may be any form of wired or wireless communication interface known to those having ordinary skill in the art, and there is no specific limitation.

Based on the above, in the invention, the critical circuit block is defined by analyzing the current demand value of each of the bump current sources. Moreover, a design structure adjustment analysis is performed for the high-risk area of capture voltage drop on the critical circuit block circuit to reduce the time needed for the voltage drop analysis operation, and the voltage drop risk in the capture mode of the circuit scan chain may be comprehensively evaluated.

What is claimed is:

1. An analyzing method of capture IR drop, comprising:
   receiving circuit layout information and package model information of a circuit;
   analyze, according to the circuit layout information and the package model information, a plurality of circuit blocks respectively corresponding to a plurality of bump current sources in the circuit;
   calculating at least one critical circuit block according to each of the bump current sources and a current demand value of each of the corresponding circuit blocks, comparing the current demand value of the bump current source with a reference threshold to set each of the plurality of circuit blocks as the at least one critical circuit block; and
   analyzing a clock tree architecture of the at least one critical circuit block to obtain design structure adjustment information.

2. The analyzing method of claim 1, wherein the step of calculating the at least one critical circuit block according to each of the bump current sources and the current demand value of each of the corresponding circuit blocks comprises:
   calculating a plurality of working currents of each of the circuit blocks, and generating the current demand value corresponding to each of the circuit blocks according to the working currents; and
   determining whether the current demand value of each of the circuit blocks is greater than the reference threshold, so as to set each of the circuit blocks as the at least one critical circuit block.

3. The analyzing method of claim 2, wherein the working currents comprise a first working current through which data passes through each of the circuit blocks; a second working current generated by a combinational logic circuit of each of the circuit blocks; and a third working current generated by each of the circuit blocks receiving a clock signal.

4. The analyzing method of claim 1, wherein the step of analyzing the at least one clock tree architecture of the at least one critical circuit block to obtain the design structure adjustment information comprises:
   analyzing, in the at least one clock tree architecture, each of a plurality of integrated control gates and a first quantity of a plurality of correspondingly controlled first registers and a second quantity of a plurality of second registers not controlled by an integrated control gate; and
   generating the design structure adjustment information according to a magnitude relationship between the first quantity and a reference value and according to a magnitude relationship between the second quantity and two reference values.

5. The analyzing method of claim 4, wherein when the first quantity is less than the reference value, the design structure adjustment information is provided to:
   add a plurality of logic circuits to respectively control the integrated control gates; and
   activate the integrated control gates in a time-share manner via the logic circuits.

6. The analyzing method of claim 4, wherein when the first quantity is greater than the reference value, the design structure adjustment information is provided to:
   add a plurality of auxiliary integrated control gates after each of the integrated control gates, wherein the first registers are divided into a plurality of portions and respectively coupled to the auxiliary integrated control gates;
   add a plurality of logic circuits to respectively control the auxiliary integrated control gates; and
   activate the auxiliary integrated control gates in a time-share manner via the logic circuits.

7. The analyzing method of claim 4, wherein when the second quantity is greater than the reference value, the design structure adjustment information is provided to:
   provide a plurality of auxiliary integrated control gates to be coupled between a clock signal and the second registers, wherein the second registers are divided into a plurality of portions and respectively coupled to the auxiliary integrated control gates;
   add a plurality of logic circuits to respectively control the auxiliary integrated control gates; and
   activate the auxiliary integrated control gates in a time-share manner via the logic circuits.

8. A capture IR drop analyzer, comprising:
a transmission interface configured to receive circuit layout information and package model information of a circuit; and
a controller coupled to the transmission interface, and configured to:
- analyze, according to the circuit layout information and the package model information, a plurality of circuit blocks respectively corresponding to a plurality of bump current sources in the circuit;
- calculate at least one critical circuit block according to each of the bump current sources and a current demand value of each of the corresponding circuit blocks, comparing the current demand value of the bump current source with a reference threshold to set each of the plurality of circuit blocks as the at least one critical circuit block; and
- analyze a clock tree architecture of the at least one critical circuit block to obtain design structure adjustment information.

9. The capture IR drop analyzer of claim 8, wherein the controller is further configured to:
- calculate a plurality of working currents of each of the circuit blocks, and generate the current demand value corresponding to each of the circuit blocks according to the working currents; and
- determine whether the current demand value of each of the circuit blocks is greater than the reference threshold, so as to set each of the circuit blocks as the at least one critical circuit block.

10. The capture IR drop analyzer of claim 9, wherein the working currents comprise a first working current through which data passes through each of the circuit blocks; a second working current generated by a combinational logic circuit of each of the circuit blocks; and a third working current generated by each of the circuit blocks receiving a clock signal.

11. The capture IR drop analyzer of claim 8, wherein the controller is further configured to:
- analyze, in the at least one clock tree architecture, each of a plurality of integrated control gates and a first quantity of a plurality of correspondingly controlled first registers and a second quantity of a plurality of second registers not controlled by an integrated control gate; and
- generate the design structure adjustment information according to a magnitude relationship between the first quantity and a reference value and according to a magnitude relationship between the second quantity and two reference values.

12. The capture IR drop analyzer of claim 11, wherein when the first quantity is less than the reference value, the design structure adjustment information provided by the controller comprises:
- adding a plurality of logic circuits to respectively control the integrated control gates; and
- activating the integrated control gates in a time-share manner via the logic circuits.

13. The capture IR drop analyzer of claim 11, wherein when the first quantity is greater than the reference value, the design structure adjustment information provided by the controller comprises:
- adding a plurality of auxiliary integrated control gates after each of the integrated control gates, wherein the first registers are divided into a plurality of portions and respectively coupled to the auxiliary integrated control gates;
- adding a plurality of logic circuits to respectively control the auxiliary integrated control gates; and
- activating the auxiliary integrated control gates in a time-share manner via the logic circuits.

14. The capture IR drop analyzer of claim 11, wherein when the second quantity is greater than the reference value, the design structure adjustment information provided by the controller comprises:
- providing a plurality of auxiliary integrated control gates to be coupled between a clock signal and the second registers, wherein the second registers are divided into a plurality of portions and respectively coupled to the auxiliary integrated control gates;
- adding a plurality of logic circuits to respectively control the auxiliary integrated control gates; and
- activating the auxiliary integrated control gates in a time-share manner via the logic circuits.

* * * * *